(12) United States Patent
Yamagishi

(10) Patent No.: US 7,940,442 B2
(45) Date of Patent: May 10, 2011

(54) OPTICAL SCANNING DEVICE AND COMPONENT THEREOF

(75) Inventor: Takeshi Yamagishi, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 364 days.

(21) Appl. No.: 12/185,169

(22) Filed: Aug. 4, 2008

(65) Prior Publication Data

US 2009/0041070 A1     Feb. 12, 2009

(30) Foreign Application Priority Data

Aug. 10, 2007    (JP) ................................ 2007-209276

(51) Int. Cl.
     *G02B 26/08*      (2006.01)
(52) U.S. Cl. .................................................. 359/209.1
(58) Field of Classification Search ............... 359/209.1, 359/211.1
See application file for complete search history.

(56) References Cited

U.S. PATENT DOCUMENTS 7,403,316 B2 *   7/2008   Amada ...................... 359/204.1

FOREIGN PATENT DOCUMENTS

JP      2006-251513      9/2006

* cited by examiner

*Primary Examiner* — Euncha P Cherry
(74) *Attorney, Agent, or Firm* — Katten Muchin Rosenman LLP

(57) ABSTRACT

To provide an optical scanning device capable of scanning with a simple configuration.

It includes a laser unit 10 for emitting a light beam, a laser control unit 42 for adjusting the light beam emitted by the laser unit 10, first and second prism units 20 and 30 through which an incident light beam is passed as a scanning beam, an angle between the incident light beam and the scanning beam being variable, and a prism control unit 44 for supplying an instruction to the first and second prism units 20 and 30 in order to change the angle between the incident light beam and the scanning beam. The first and second prism units 20 and 30 receive the light beam emitted by the laser unit 10 and emerge the scanning beam according to an instruction from the prism control unit 44 about the incident light beam.

12 Claims, 12 Drawing Sheets

OPTICAL SCANNING DEVICE AND COMPONENT THEREOF

CROSS REFERENCE TO RELATED APPLICATION

The present application claims priority from Japanese Patent Application No. 2007-209276 filed Aug. 10, 2007, the disclosure of which is hereby incorporated by reference herein.

BACKGROUND OF THE INVENTION

1. Technical Field

The present invention relates to an optical scanning device having a simple structure and components thereof, in which the optical scanning device is used for an optical instrument, such as a projector, which provides images by scanning with optical signals.

2. Background

There are different kinds of projectors in the art, such as those using a liquid crystal display (LCD) or a liquid crystal on silicon (LCOS), as well as those using a micro electro mechanical system (MEMS) array mirror element including a digital mirror device (DMD). Optical scanning device should be used that is capable of scanning with an optical signal in order to produce images with such a projector.

Conventional optical scanning devices of this type typically comprise an optical system and an optical deflection mechanism for deflecting optical signals in a predetermined direction. Scanning by using laser rays reflected from a mirror is a simplified version of a combination of an optical system and an optical deflection mechanism.

Japanese Patent Laid-open No. 2006-251513 A1 discloses an optical scanning device which is a combination of a device capable of performing scans with an optical signal in a varying subscanning direction and a device capable of forming images at various focal lengths. They are cooperated with each other to provide images of high quality without any color slippage or color change.

Conventional optical scanning devices require a lot of parts and components to enlarge images. In addition, projectors using a mirror rely on reflection of light, so that the reflected light is limited by an optical system on the incident side, such as an angle of illumination. Due to various constraints and restrictions, downsizing of such devices is challenging. Additionally, high production costs are passed on to a price of a finished product, which is a factor of limiting widespread use of such devices.

Therefore, an object of the present invention is to provide an optical scanning device and components thereof with which it is possible to perform scans by using a simple configuration in order to, for example, provide a small, cost-effective projector.

SUMMARY OF THE INVENTION

An optical scanning device according to the present invention that solves the aforementioned problem comprises first control means for controlling a light source to adjust conditions for emission of an optical signal emitted by said light source; a light transmission mechanism adapted to receive the optical signal emitted by said light source, allows the received optical signal to pass therethrough, and emerges it as a scanning optical signal, said light transmission mechanism being also adapted to serve to vary an angle of deviation in response to an input of predetermined control information, the angle of deviation being an angle formed between the incident optical signal entering said light transmission mechanism and the scanning optical signal which emerges from said light transmission mechanism; and second control means for use in providing the control information to said light transmission mechanism.

The optical scanning device according to the present invention is capable of scanning only by using a light transmission mechanism, which contributes for downsizing and cost reduction.

Said light transmission mechanism includes, for example, a light transmission member adapted to deform, according to an external force, at least one of a face on which the optical signal is incident, and another face from which the scanning optical signal emerges, thereby to vary an angle of incidence of the laser beam or an angle of output of the laser beam; and a driving mechanism for use in applying the external force to the light transmission member.

This light transmission member includes, for example, a fluid compartment for containing a fluid with a refractive index that is different from the refractive index of the atmospheric air, the fluid compartment having a joint part made of an elastic material, the joint part connecting the face on which the optical signal is incident and the face from which the scanning beam emerges, the joint part being adapted to deform freely according to the volume of the fluid contained in the fluid compartment.

The light transmission member may take one of the following configurations.

(1) The light transmission member is formed to have a ring shape with a bore therein, at least one of the angle of incidence and the angle of output being varied continuously due to a slope formed in the direction from the periphery to the center. The driving mechanism is adapted to continuously vary the angle of deviation by means of rotating the light transmission member on the bore.

(2) The light transmission member is formed to have a ring shape with a bore therein, at least one of the angle of incidence and the angle of output being varied by a wavy surface profile with a series of alternating ridges and grooves on the surface along a predetermined direction. The driving mechanism is adapted to periodically vary the angle of deviation at timing determined by the alternating interval of the wavy surface profile by means of rotating the light transmission member on the bore.

(3) The light transmission member is formed to have a ring shape with a bore therein, at least one of the angle of incidence and the angle of output being varied by a plurality of diffraction gratings formed in a surface thereof, each diffraction grating being made up of a set of slits the orientation of which is different from the orientation of other sets of slits. The driving mechanism is adapted to vary the angle of deviation according to the orientation of the slits by means of rotating the light transmission member on the bore.

(4) The light transmission member includes a liquid prism having a shape of a plano-convex lens. The driving mechanism includes a contractile member connected to a convex portion of the liquid prism, the driving mechanism being adapted to contract and extend the contractile member according to the control information to vary the curvature of the convex portion of the liquid prism, thereby to vary at least one of the angle of incidence of the optical signal directed to the liquid prism and the angle of output of the scanning optical signal.

(5) The light transmission member includes a liquid lens having a shape of a plano-convex lens of which refractive index varies along with a voltage applied thereto. The driving mechanism is adapted to apply a voltage having a value determined according to the control information to the liquid lens, thereby to vary at least one of the angle of incidence of the optical signal directed to the liquid lens and the angle of output of the scanning optical signal.

(6) The light transmission member includes a liquid lens which uses two immiscible liquids forming two distinct layers, the liquids being contained in an electrically conductive container. The driving mechanism is adapted to apply a voltage having a value determined according to the control information to the container and one of the layers of the liquid lens to deform the surface profile of the liquid-liquid interface of the liquid lens, thereby to vary at least one of the angle of incidence of the optical signal directed to the liquid lens and the angle of output of the scanning optical signal.

(7) The light transmission member includes a lens-shaped fluid which is displaced in response to a magnetic force. The driving mechanism includes electromagnets disposed on both sides of the fluid and a control device for the electromagnets, the control device being adapted to produce a magnetic field by the flow of an electric current through the electromagnets according to the control information to displace the fluid, thereby to vary at least one of the angle of incidence of the optical signal directed to the fluid and the angle of output of the scanning optical signal. The fluid may be, for example, a magnetic fluid or an ionic liquid.

In the optical scanning device according to the present invention as described above, when the light transmission member includes a first refracting member having a first beam receiving surface, the first beam receiving surface being for adjusting an angle between the laser beam incident on the first beam receiving surface and the line perpendicular to the surface at the point of incidence, the first refracting member being adapted to move the scanning optical signal in a straight in a first direction according to the angle of incidence on the first beam receiving surface, and a second refracting member having a second beam receiving surface, the second beam receiving surface being for receiving the scanning optical signal emitted by the first refracting member, the second refracting member being adapted to change the angle of incidence upon reception of the scanning optical signal, the second refracting member being adapted to move the scanning optical signal received through the second beam receiving surface in a straight in a second direction according to the angle of incidence on the second beam receiving surface, the second direction being perpendicular to the first direction, a combination of the first refracting member and the second refracting member allows the scanning optical signal to move in a two-dimensional plane. By being capable of moving in the two-dimensional direction, plane scans can be performed.

In addition, when the light source is for producing laser beams of different colors as the optical signals, the first control means is adapted to control the light source to produce the laser beams of the different colors one by one as the optical signal. The second control means has a correction table on which correction values for the angle of deviation are stored, and is adapted to read, from the correction table, a correction value suitable for the color of the laser to be emitted by the light source, to produce the control information according to the read correction value, or to correct the control information produced. This makes it possible to correct the difference in angle of deviation due to the difference in laser color. This correction makes it easy to bring light beams of different colors into focus onto the same position.

A light transmission member for optical scanning according to the present invention comprises a beam receiving surface on which an optical signal emitted by a light source is incident; a beam emerging surface through which the received optical signal emerges as a scanning optical signal; and a mechanism for use in adjusting a slope of at least one of the beam receiving surface and the beam emerging surface to vary an angle of deviation in response to an input of predetermined control information, the angle of deviation being an angle formed between the incident optical signal entering it and the scanning optical signal which emerges from said light transmission member.

In the optical scanning device according to the present invention, the angle of deviation (i.e., an angle formed between the incident optical signal entering the light transmission mechanism and the scanning optical signal which emerges from the light transmission mechanism) can be varied by using the control information supplied to the light transmission member when an optical signal emitted by the light source is transmitted as a scanning optical signal. This eliminates necessity of a complex optical system or optical deflection mechanism, which achieves downsizing and cost reduction at the same time.

BEST MODES FOR CARRYING OUT THE INVENTION

Now, an embodiment of the present invention is described with reference to the drawings.

<Fundamental Configuration>

Figure 1:
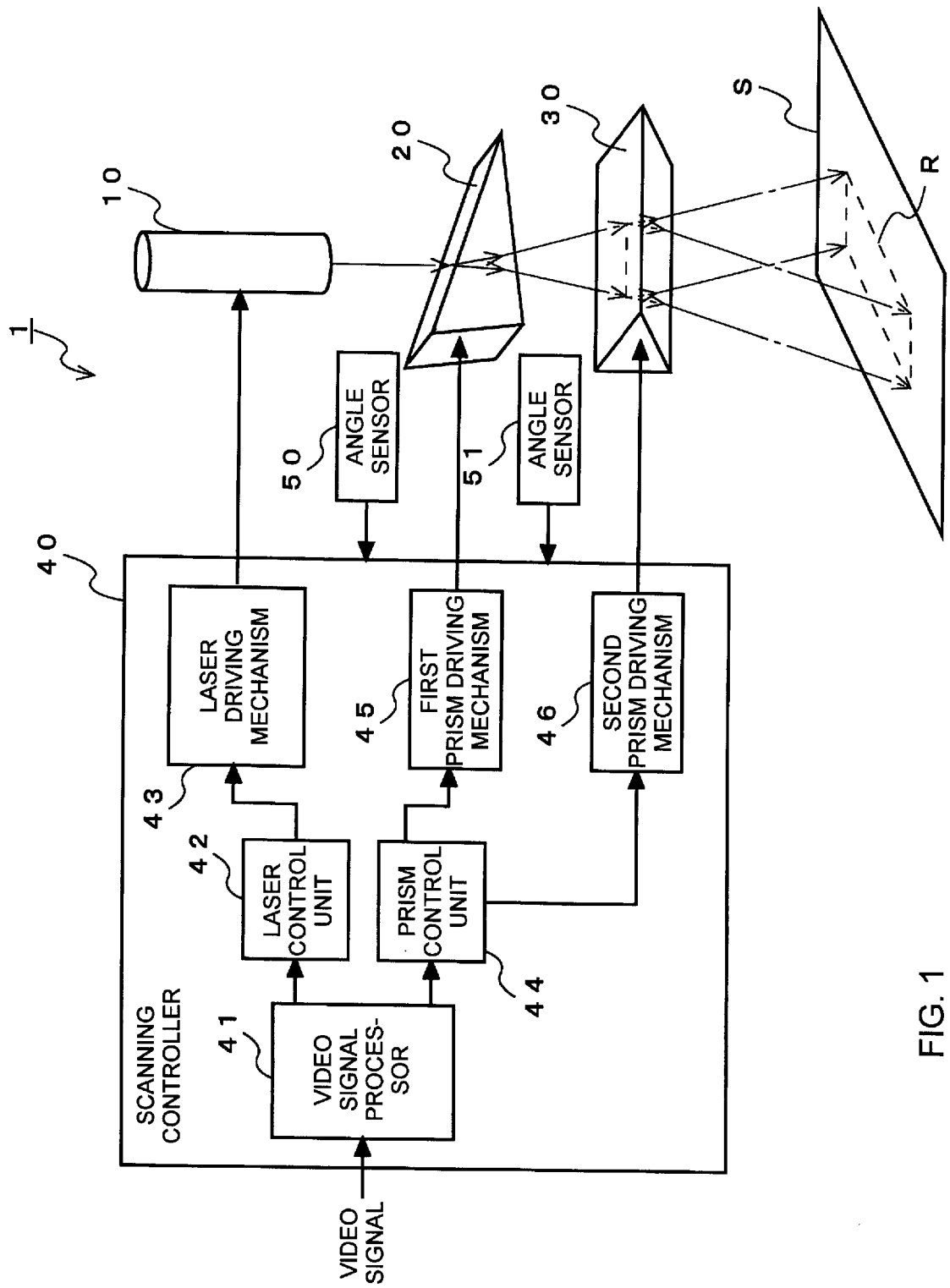
FIG. 1 is a schematic representation of an exemplary configuration for an optical scanning device according to an embodiment.

FIG. 1 is a schematic representation of an exemplary configuration for an optical scanning device 1 according to this embodiment.

The optical scanning device 1 comprises a laser unit 10, a first prism unit 20, a second prism unit 30, and a scanning controller 40. The laser unit 10 is an example of a light source. The first and second prism units 20 and 30 are positioned to allow a laser beam, an example of an optical signal, produced by the laser unit 10 to pass therethrough. The scanning controller 40 is for controlling operations of the laser unit 10, the first prism unit 20, and the second prism unit 30.

The laser beam emitted by the laser unit 10 is directed to the first prism unit 20, and then to the second prism unit 30. The first and second prism units 20 and 30 are controlled by the scanning controller 40 to change the optical path of the laser beam emitted by the laser unit 10. Scanning with the laser beam is carried out during its movement through the surface of the screen S.

The laser unit 10 may be a single laser unit that emits monochromatic light when an image to be produced is a monochromic one. The laser unit 10 is, however comprised of an R-laser unit 11, a G-laser unit 12, and a B-laser unit 13 which correspond to the three fundamental colors: red (R), green (G), and blue (B), as shown in FIG. 2 when an image to be produced is a color one.

Figure 2:
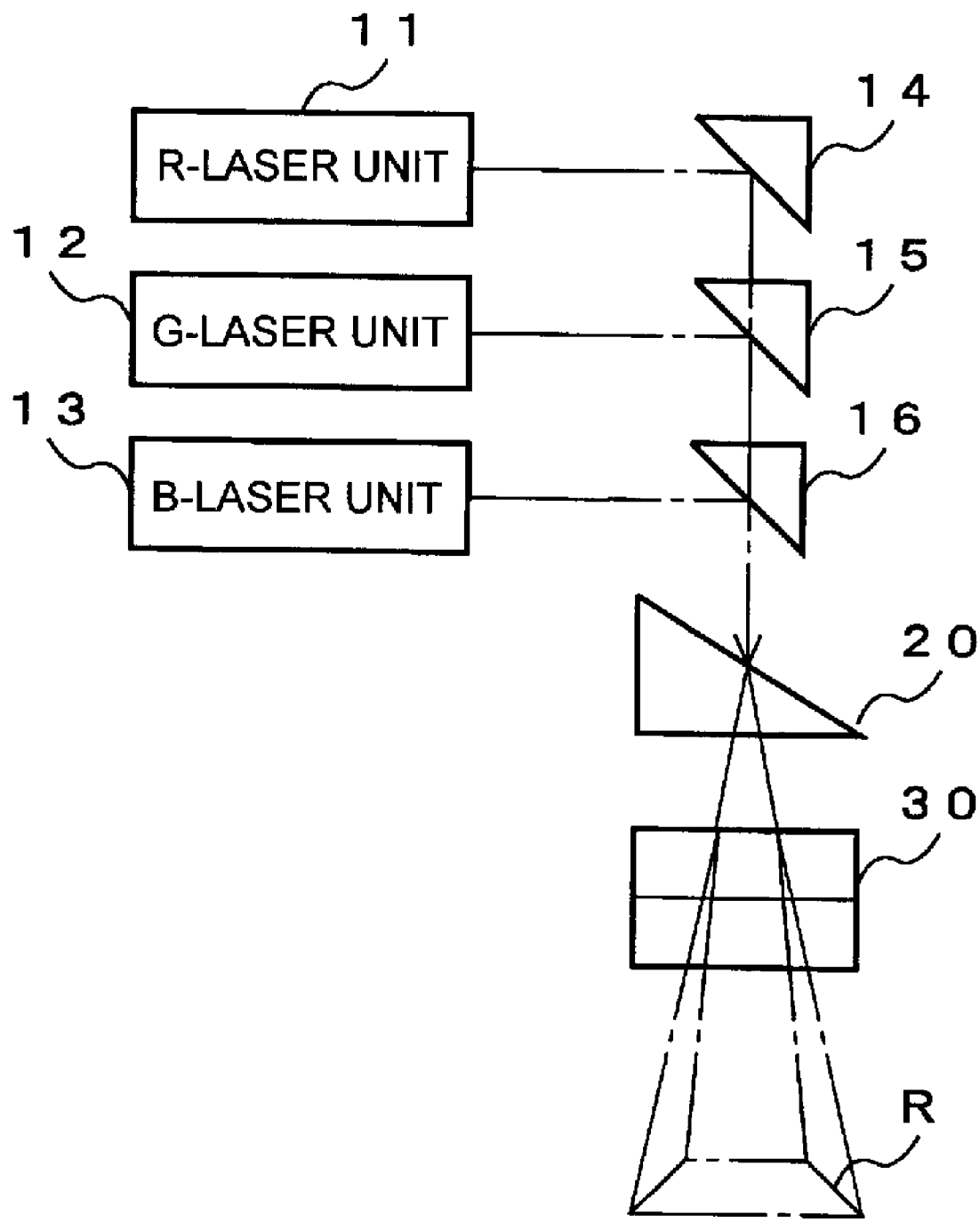
FIG. 2 is a schematic representation of an exemplary configuration for an optical scanning device for displaying color images.

In a configuration illustrated in FIG. 2, a red laser beam emitted by the R-laser unit 11 is reflected from a half mirror 14. It is directed to the first prism unit 20, passing through half mirrors 15 and 16. A green laser beam emitted by the G-laser unit 12 is reflected by the half mirror 15. It is directed to the first prism unit 20, passing through the half mirror 16. A blue laser beam emitted by the B-laser unit is reflected from the half mirror 16 and is then directed to the first prism unit 20. The laser unit 10 is disposed at a fixed position.

Although the present invention is exemplified herein with regard to an embodiment in which a laser beam is used for scanning, it will be understood that other types of collimated beams may be used, including those produced by a light-emitting diode combined with an appropriate optical system. To provide color images, each of the R-, G-, and B-laser units 11, 12, and 13 can be implemented using a laser diode and a color filter in an appropriate color combination.

Each of the first and second prism units 20 and 30 receives a laser beam emitted by the laser unit 10 and produces a scanning beam as an output. An angle of incidence between the optical path of a laser beam incident on a surface of the first prism unit 20 from the laser unit 10 and the line perpendicular to the surface at the point of incidence can be varied. Likewise, an output angle between the optical axis of the laser beam exiting from the first prism unit 20 and the line perpendicular to the surface at the point of exit can also be varied. The same applies to the second prism unit 30. Thus, the first and second prism units 20 and 30 serve to vary an angle between the direction of propagation of the laser beam and the direction of propagation of the scanning beam. Depending on the angle of incidence and/or the angle of output, the scanning beam from the first prism unit 20 enters the first prism unit 20 at different angles.

The second prism unit 30 receives the scanning beam produced from the first prism unit 20. The scanning beam exiting from the second prism unit 30 scans a predetermined area R on the screen S. It should be noted that, while the optical scanning device 1 uses two prism units for scanning the area R on the screen S, the first prism unit 20 can solely be used to achieve the purpose when the area R is scanned linearly. If both the first and second prism units 20 and 30 are used, they may be provided separately as two components or may be integrated with each other as a single component.

The first and second prism units 20 and 30 are associated with angle sensors 50 and 51, respectively. The angle sensors 50 and 51 are for measuring a prism angle. As used herein, the term "prism angle" refers to an angle formed between the surface of the first prism unit 20 (or the second prism unit 30) on which the laser beam (or the scanning beam) is incident and the plane perpendicular to the optical axis of the laser beam (or the scanning beam). The surface on which the laser beam (or the scanning beam) is incident is hereinafter referred to as a "beam receiving surface". The values representing the prism angles measured by the angle sensors 50 and 51 are supplied to the scanning controller 40.

The angle sensors 50 and 51 may be any type of sensor that can measure a change in angular position of the first and second prism units 20 and 30, respectively. Exemplary sensors include, but are not limited to, a position sensitive detector (PSD), electromagnetic detectors (resolvers), and potentiometers (volumes). Alternatively, capacitance sensors having a simple structure may be used. The working principle of the capacitance sensor relies on the fact that when an alternating voltage is applied to a capacitor the current flowing through the capacitor is proportional to the capacitance.

Details of the first and second prism units 20 and 30 will be described later.

The scanning controller 40 controls the laser unit 10, the first prism unit 20, and the second prism unit 30 in response to an analog or digital video signal supplied from an external device such as, for example, a predetermined image processor (not shown). In this embodiment, the scanning controller 40 includes a video signal processor 41, a laser control unit 42, a laser driving mechanism 43, a prism control unit 44, a first prism driving mechanism 45, and a second prism driving mechanism 46.

The video signal processor 41 generates, in response to a video signal supplied from an external device, laser beam control information for use in controlling the laser unit 10 and prism control information for use in controlling the first and second prism units 20 and 30. The laser beam control information is supplied to the laser control unit 42 while the prism control information is supplied to the prism control unit 44. When the laser unit 10 is comprised of a plurality of laser units, the laser beam control information is generated for each of them such as the R-laser unit 11, the G-laser unit 12, and the B-laser unit 13. When only one of the first and second prism units 20 and 30 is used, the prism control information is provided for that single one.

The laser control unit 42 controls the laser driving mechanism 43 to make the laser unit 10 emit a desired laser beam. The laser beam control information is a signal for use in adjusting, for example, the timing of laser beam emission by the laser unit 10 and the intensity of the laser beam. Thus, the laser control unit 42 contributes to adjust the laser beam according to the laser beam control information. When the laser unit 10 is comprised of three laser units, i.e., the R-laser unit 11, the G-laser unit 12, and the B-laser unit 13, the laser beams emitted by these laser units are independently adjusted.

The prism control unit 44 controls the first and second prism driving mechanisms 45 and 46 to perform scans by using the scanning beam from the first and second prism units 20 and 30. The prism control information is a signal indicating, for example, a point to be scanned on the screen S. The prism control unit 44 supplies the control information for controlling the first and second prism units 20 and 30 to the first and second prism driving mechanisms 45 and 46, respectively, in order to scan the point on the screen S indicated by the prism control information. The scanning beam is focused on the point on the screen indicated by the prism control information.

The first and second prism driving mechanisms 45 and 46 are supplied with the values representing the prism angles measured by the angle sensors 50 and 51. Each of the first and second prism driving mechanisms 45 and 46 corrects the prism angle based on the received value of the prism angle. An optimum prism angle can be obtained as a result of such feedback of the prism angle.

The values representing the prism angles are also supplied to the laser control unit 42. The first and second prism units 20 and 30 are periodically moved by the prism control unit 44. Knowing about the prism angle makes it possible to control emission of the laser beam.

Figure 3A:
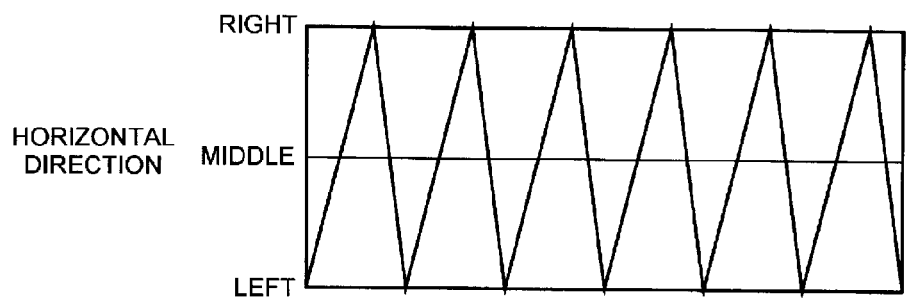
FIG. 3a shows a waveform of a signal included in the prism control information for specifying a point to be scanned in the horizontal direction.
Figure 3B:
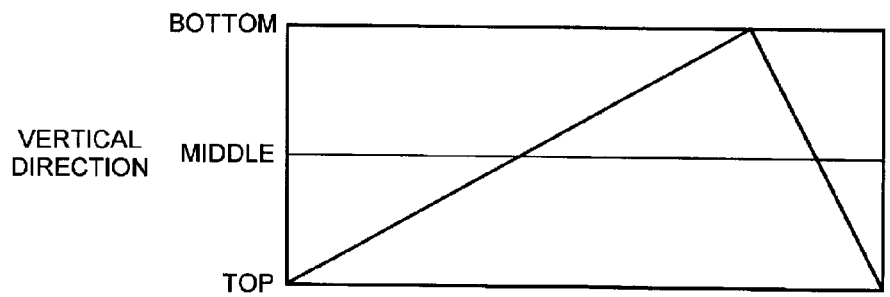
FIG. 3b shows a waveform of a signal included in the prism control information for specifying a point to be scanned in the vertical direction.

FIG. 3a shows a waveform of a signal included in the prism control information for specifying a point to be scanned by the first prism driving mechanism 45. FIG. 3a corresponds to the horizontal scanning. FIG. 3b shows a waveform of a signal included in the prism control information for specifying a point to be scanned by the second prism driving mechanism 46. FIG. 3b corresponds to the vertical scanning.

Figure 3C:
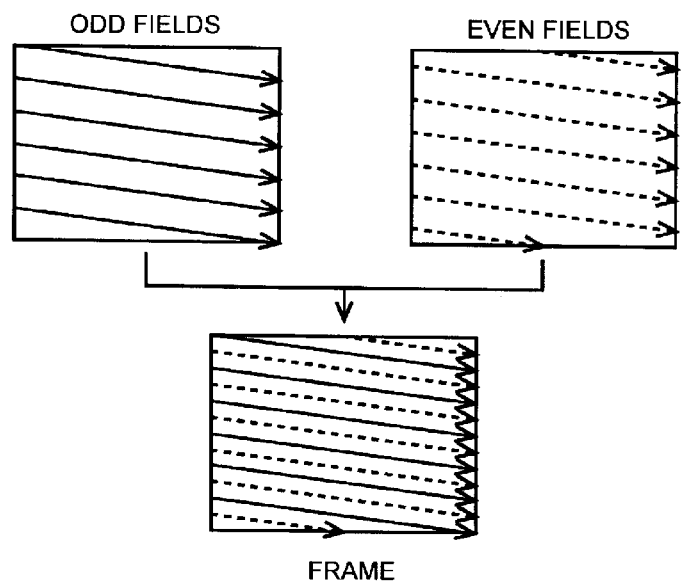
FIG. 3c is a diagrammatic representation illustrating how the odd and even fields are interlaced to provide a frame.

With the signals having a zigzag waveform as shown in FIGS. 3a and 3b, the scanning beam moves up and down while being regularly swung right and left for scanning, as shown in FIG. 3c. Scanning produces an afterimage along the path of the scanning beam, so that it appears that a rectangular plane emits light.

For example, an NTSC (National Television Standards Committee) television image has 525 horizontal lines per complete screen image. The lines are scanned from left to right in the horizontal direction as well as from top to bottom in the vertical direction. More specifically, each frame is composed of two interlaced fields in order to broadcast image signals within a narrow bandwidth. The odd lines are scanned in one field (the resulting incomplete image is referred to as an "odd field") and then the even lines are scanned in a second field (the resulting incomplete image is referred to as "even field"). The odd and even fields are interlaced to make a complete screen image, i.e., a frame. FIG. 3c is a diagrammatic representation illustrating how the odd and even fields are interlaced to provide a frame.

This process results in 60 fields per second, which corresponds to 30 frames per second due to its interlaced nature. The 60-field-per-second means that the field frequency or the vertical scan frequency is 60 Hz. As described above, NTSC employs a fixed number of lines per frame, so the number of lines it takes to scan an image on the screen in the horizontal direction is also fixed as a horizontal scan frequency. For field transmission, a 525 line image is separated into two fields of 262.5 lines each. Because there are 262.5 lines per field, the line rate can be given as 262.5×60 (vertical scan frequency) =15750 Hz (horizontal scan frequency).

According to the NTSC standard, the lines are scanned 525 times in the horizontal direction (from left to right) as shown in FIG. 3a, during which the lines are scanned two times in the vertical direction (top to bottom) as shown in FIG. 3b. In other words, the lines are scanned 262.5 times from top to bottom and then another 262.5 times from bottom to top. This makes a frame having 525 lines.

Next, an example of a specific configuration of the first and second prism units 20 and 30 is described.

FIRST EMBODIMENT

A specific configuration of the first prism unit 20 is described with reference to FIGS. 4a and 4b. The second prism unit 30 is identical in configuration to the first prism unit 20 and a further description thereof will be omitted.

The first prism unit 20 includes a refracting member 21, a driving member 22, and an elastic member 23. The refracting member 21 and the driving member 22 are filled with a transparent fluid such as a liquid. The refracting member 21 is connected in fluid communication with the driving member 22.

The refracting member 21 has a transparent surface through which a laser beam passes at a position to which a laser beam is directed or from which a scanning beam exits. The orientation of the refracting member 21 can be changed relative to the optical axis of the laser beam or the optical axis of the scanning beam. In other words, the angle between the laser beam incident on the top surface of the refracting member 21 and the line perpendicular to the surface at the point of incidence can be changed. Likewise, the angle between the scanning beam that exits the bottom surface of the refracting member 21 and the line perpendicular to the surface at the point of exit can also be changed. To this end, the refracting member 21 has a deformable wall member connected to the transparent surface. From this aspect, the refracting member 21 is a kind of prism. For example, the wall member has a better stretching property or a bellows-like shape. With this configuration, when the fluid flows into the refracting member 21, the volume of it is increased. When the fluid is flows out of the refracting member 21, the volume of it is decreased.

The fluid as well as the surfaces of the refracting member 21 to which the laser beam is directed and from which the scanning beam is emitted, respectively, have different refractive indices from the air. When the fluid is a high-refractive-index fluid having a refractive index higher than that of pure water (1.44), the amount of fluid required for scanning a given area is smaller than in the case where a low-refractive-index liquid is used. This reduces energy consumption due to migration of fluid, providing better energy efficiency.

The driving member 22 is made of a stretch material, and is changed in volume when controlled by the first prism driving mechanism 45. A driving force applied by the first prism driving mechanism 45 may be, for example, an electromagnetic driving force, an electrostatic driving force, a driving force produced by a piezo element. Alternatively, the electrowetting behavior may be used such as with a liquid lens based on electrowetting.

Figure 4A:
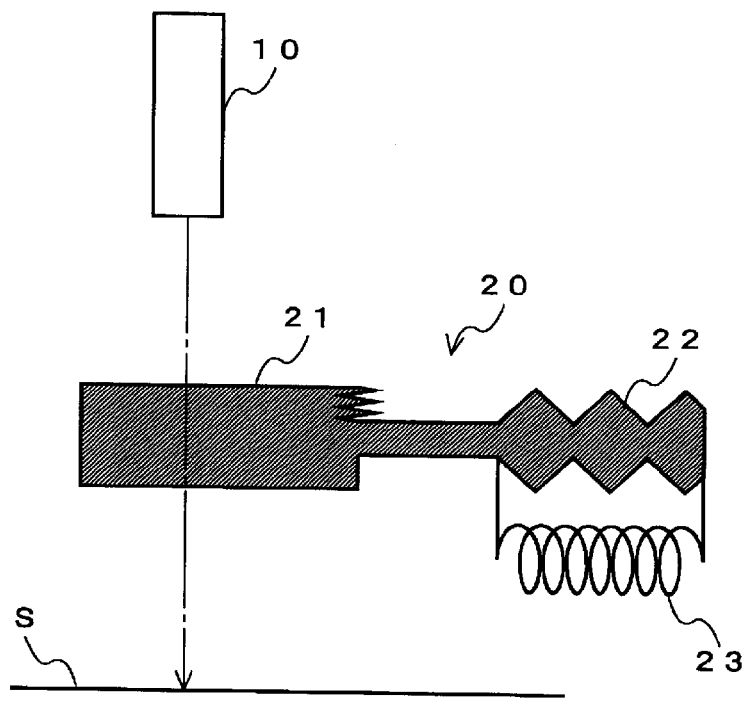
FIG. 4a shows an exemplary configuration for a prism unit according to a first embodiment.
Figure 4B:
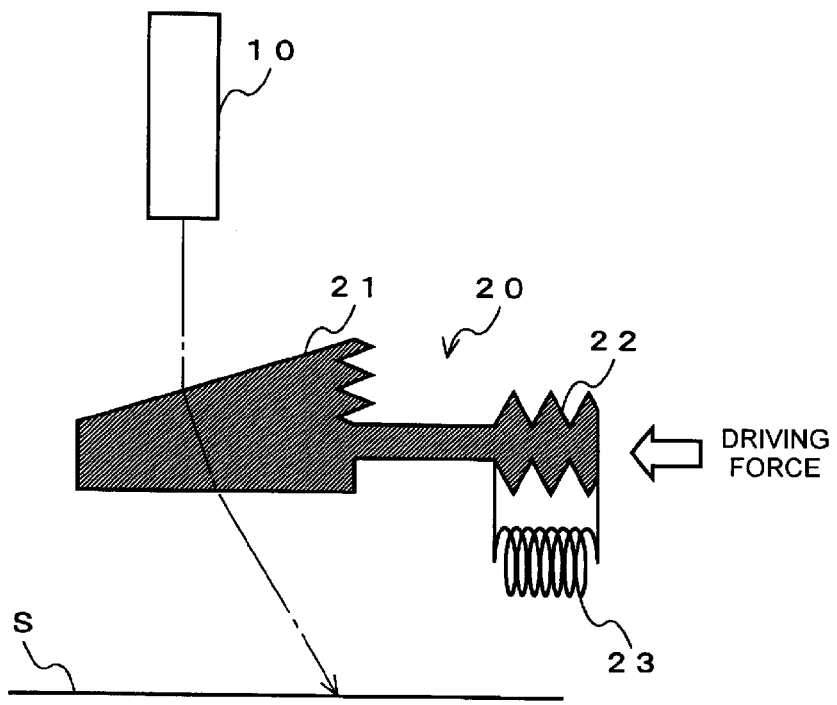
FIG. 4b shows an exemplary configuration for a prism unit according to a first embodiment.

The driving member 22 is biased by the elastic member 23 so as to have its maximum volume as shown in, for example, FIG. 4a. In response to the driving force applied by the first prism driving mechanism 45, the driving member 22 is reduced in volume as shown in FIG. 4b. Removal of the driving force results in the maximum volume due to the elastic member 23. The elastic member 23 may be a spring as well as an elastic body such as a rubber.

When no driving force is applied to the driving member 22, the emitted laser beam passes through the refracting member 21 in a straight line as shown in FIG. 4a. The laser beam then reaches a first point on the screen S.

When a driving force is applied to the driving member 22 by the first prism driving mechanism 45, the volume of the driving member 22 is decreased. The fluid flows into the refracting member 21. As a result, a predetermined angle is formed between the top surface of the refracting member 21 on which the laser beam is incident and the bottom surface thereof from which the scanning beam exits. The laser beam is refracted by the refracting member 21 and reaches a second point on the screen S that is different from the first point.

The angle made between the direction of incident of the laser beam into the refracting member 21 and the direction of the scanning beam which emerges from the refracting member 21 is referred to as the angle of deviation. The angle of deviation varies in response to deformation of the refracting member 21 by the driving member 22.

Figure 5:
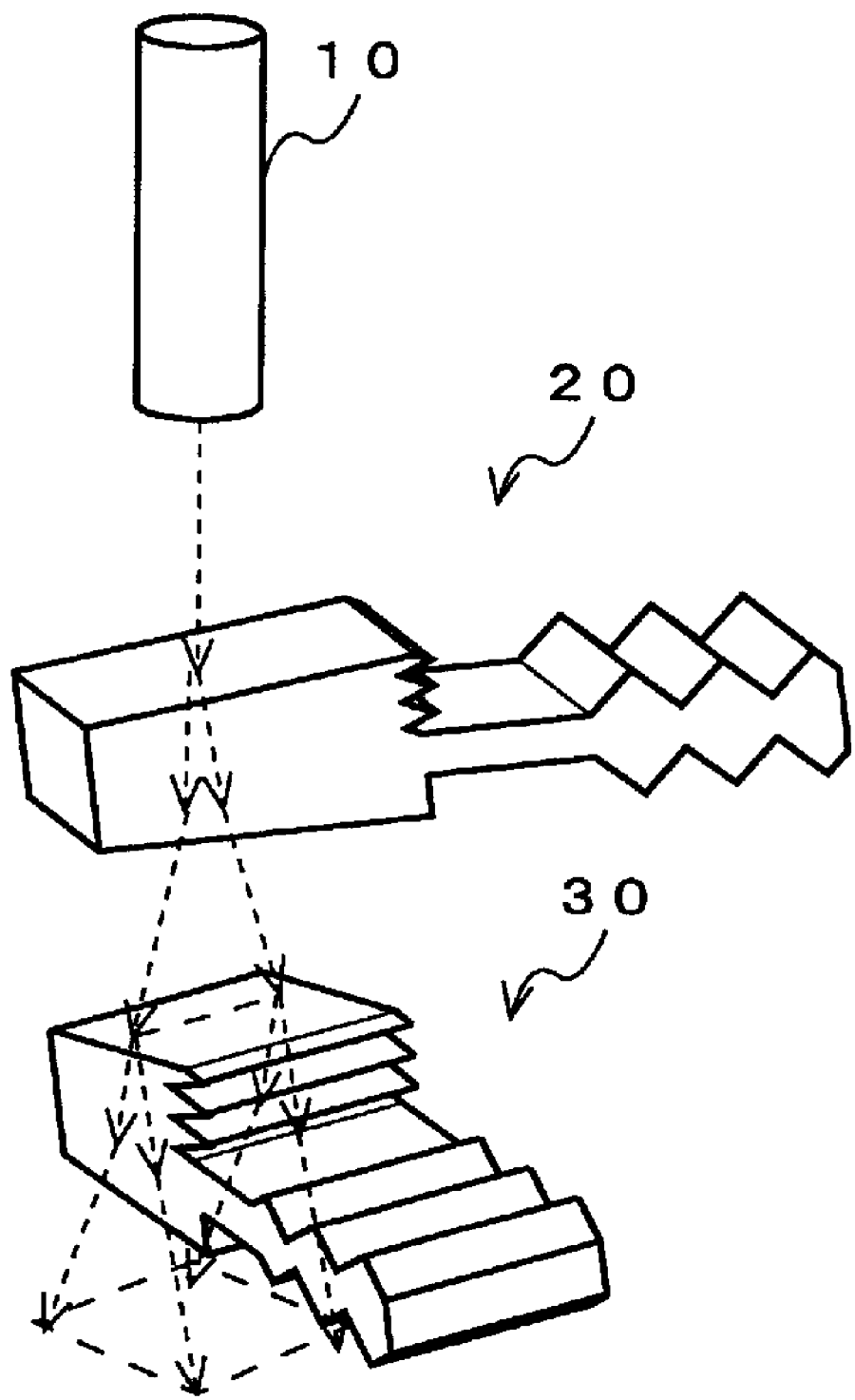
FIG. 5 shows an exemplary configuration for a case where a second prism unit is provided in addition to a first prism unit.

FIG. 5 shows an exemplary configuration for a case where the second prism unit 30 is provided in addition to the first prism unit 20. The laser beam passing through the first prism unit 20 follows a straight path on the surface of the second prism unit 30, as in the case of "line scanning" or "one-dimensional scanning". For the purpose of description, it is assumed that the direction parallel to this straight path is defined as an x-direction. The beam then passes through the second prism unit 30. It also follows a straight path in the direction perpendicular to the x-direction, i.e., a y-direction. Thus, the scanning beam successively scans lines of areas on the screen S. It is something like "area scanning" or "two-dimensional scanning".

For color image scanning, the first prism unit 20 is controlled as shown in FIGS. 6a, 6b, 6c, 7, 8a, 8b, and 8c. For simplifying the description, only the first prism unit 20 is described, but the second prism unit 30 is also controlled as in the case of the first prism unit 20 for the color image scanning.

Because of the different refractive indices for the different wavelengths, the red, green, and blue laser beams will deviate at different angles by the first prism unit 20. For example, the red laser beam deviates from its original path by a smaller angle than the green and blue laser beams because it has a longer wavelength. The blue laser beam deviates from its original path by a greater angle than the red and green laser beams because it has a shorter wavelength. It is thus impossible to bring the red, green, and blue laser beams into focus in the same plane on the screen S by means of the first prism unit 20 alone. Correction should be made to bring these laser beams into focus in the same plane.

The correction may be made by using, for example, a correction table (not shown) on which correction values for the angle of deviation are stored. The correction table may be provided in the prism control unit 44. The correction table has correction values for the red, green, and blue laser beams in association with the individual positions on the screen S. The prism control unit 44 can find the color of the laser beam by means of being notified by the laser control unit 42 or monitoring the color of the laser beam actually emitted. The prism control unit 44 obtains a correction value by using the correction table based on the color of the laser beam and the position on the screen S.

The laser control unit 42 controls the laser units 11, 12, and 13 to allow them to emit laser beams at different timings.

Additionally, with the correction values obtained in the aforementioned procedure, the angle of deviation is corrected.

Figure 6A:
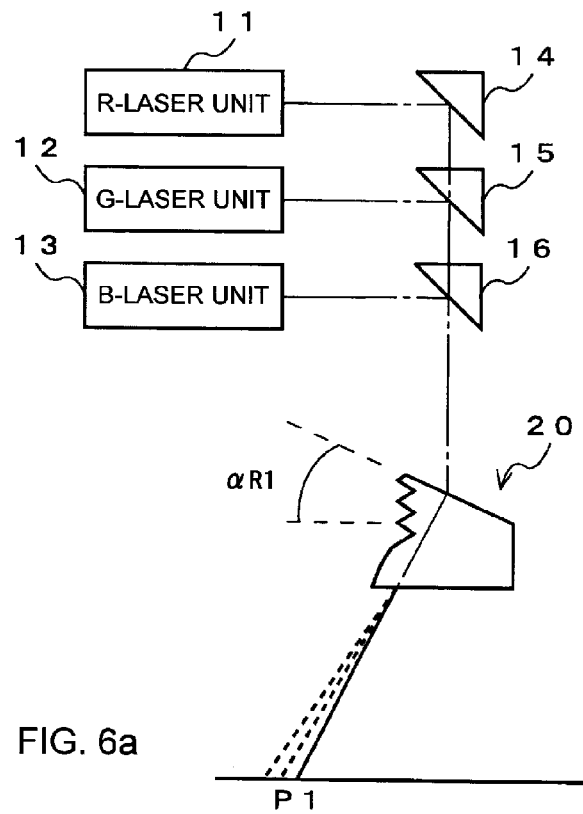
FIG. 6a is a view illustrating how color images are scanned.
Figure 6B:
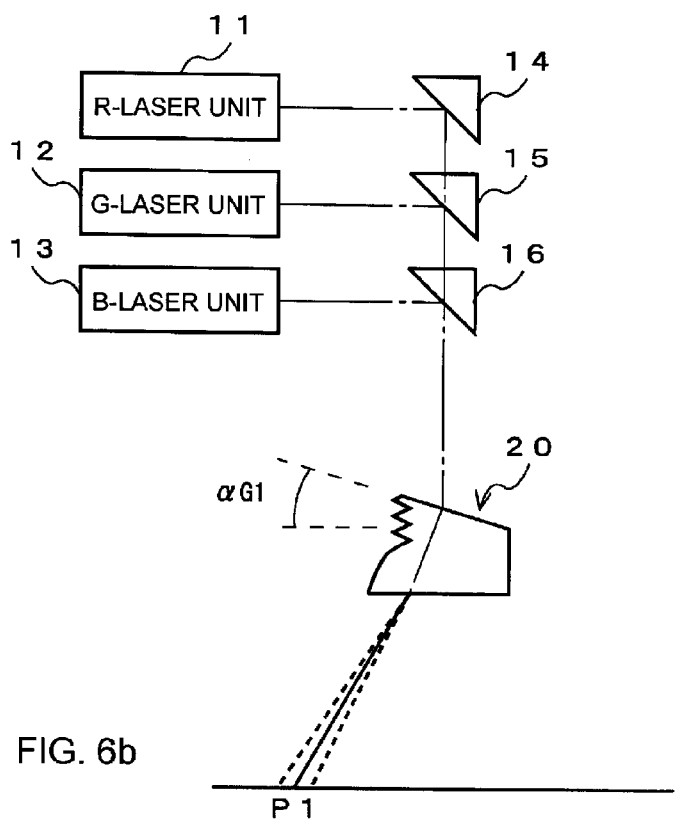
FIG. 6b is a view illustrating how color images are scanned.
Figure 6C:
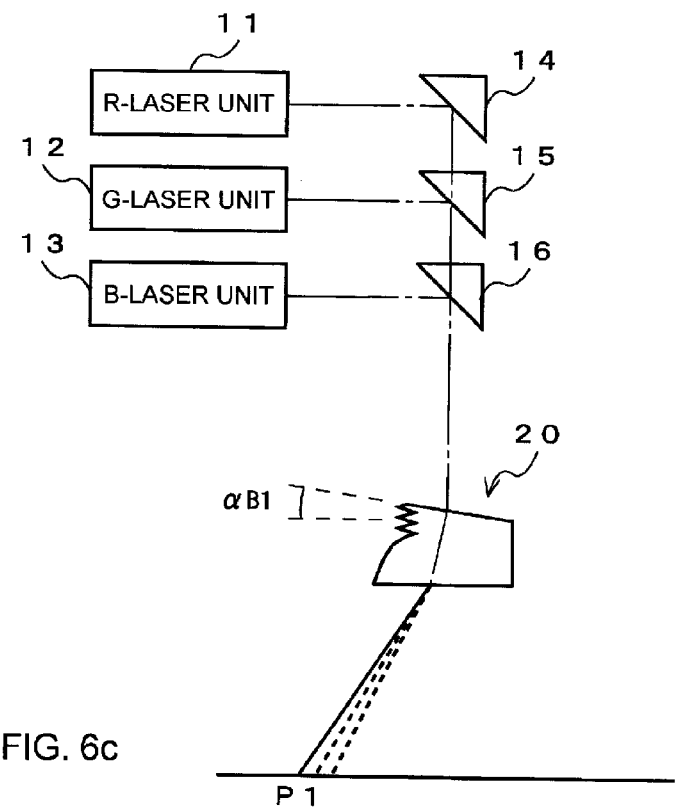
FIG. 6c is a view illustrating how color images are scanned.

An example is given below with reference to FIGS. 6a, 6b, and 6c. For scanning a point P1 the first prism unit 20 is set to use a prism angle of αR1. The red laser beam scans the point P1. Next, a prism angle of αG1 is set and the green laser beam scans the point P1. Then, a prism angle of αB1 is set and the blue laser beam scans the point P1.

According to the position specified by the prism control information, the prism control unit 44 calculates the prism angles necessary for scanning the position in question. It corrects a prism angle after it finds out the color of the laser beam and obtains a correction value from the correction table. Using the calculated prism angle, the prism control unit 44 drives the driving member 22 of the first prism unit 20 to allow the fluid to flow into the refracting member, thereby adjusting the angle of incidence of the laser beam.

The laser control unit 42 brings the R-laser unit 11, the G-laser unit 12, and B-laser unit 13 to emit their laser beams at a predetermined timing according to the laser beam control information. The R-, G-, and B-laser units 11, 12, and 13 cooperate with the first prism unit 20. The red, green, and blue laser beams are incident on the first prism unit 20 at different angles of incidence from each other, according to the timings of emission of these laser beams.

The R-laser unit 11 and the first prism unit 20 are adjusted by the laser control unit 42 and the prism control unit 44, respectively, in such a manner that the R-laser unit 11 emits a red laser beam and that the laser beam is directed to the first prism unit 20 at the prism angle of αR1. Likewise, the G-laser unit 12 and the first prism unit 20 are adjusted in such a manner that the G-laser unit 12 emits a green laser beam and that the laser beam is directed to the first prism unit 20 at the prism angle of αG1. The B-laser unit 13 and the first prism unit 20 are adjusted in such a manner that the B-laser unit 13 emits a blue laser beam and that the laser beam is directed to the first prism unit 20 at the prism angle of αB1.

Figure 7:
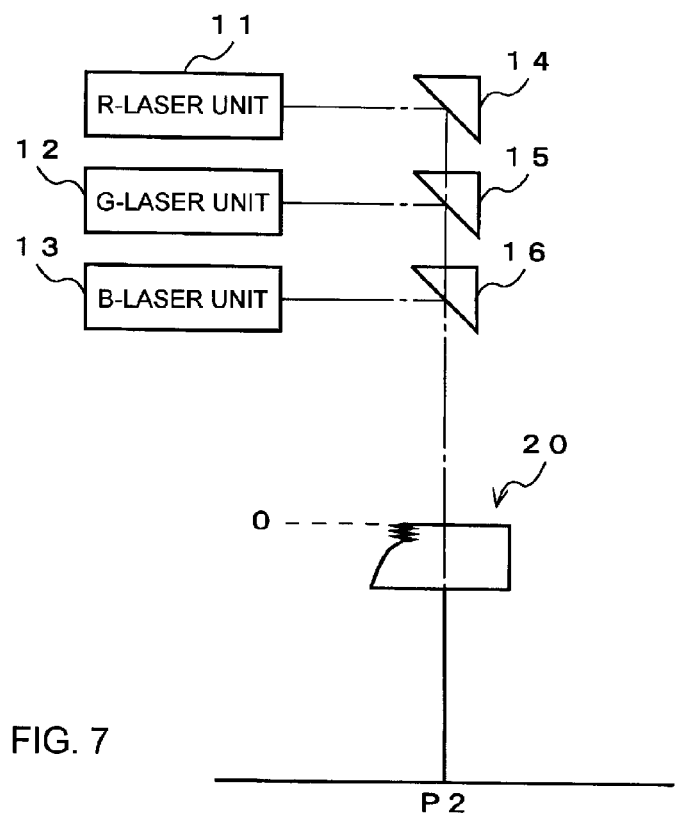
FIG. 7 is a view illustrating how color images are scanned.

FIG. 7 shows an example where the prism angle has a value of 0 degrees. When the prism angle has the value of 0 degrees, there is no difference in angle of deviation which otherwise occurs due to the color difference of the laser beams. In the case shown in FIG. 7, the red, green, and blue laser beams can be used to simultaneously scan a point P2 on the screen S. Therefore, the laser control unit 42 controls the R-laser unit 11, the G-laser unit 12, and the B-laser unit 13 to emit their laser beams at the same time. The prism control unit 44 sets the prism angle of 0 degrees.

When the prism angle has the value of 0 degrees, the prism control unit 44 may notify the laser control unit 42 of it. In response to this, the laser control unit 42 controls the R-laser unit 11, the G-laser unit 12, and the B-laser unit 13 to emit their laser beams at the same time.

Figure 8A:
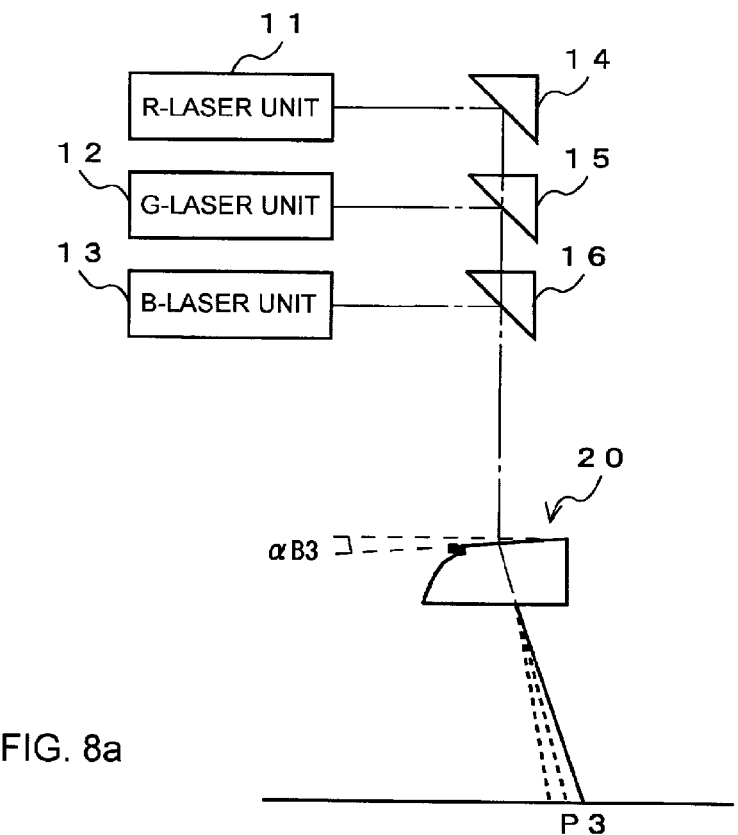
FIG. 8a is a view illustrating how color images are scanned.
Figure 8B:
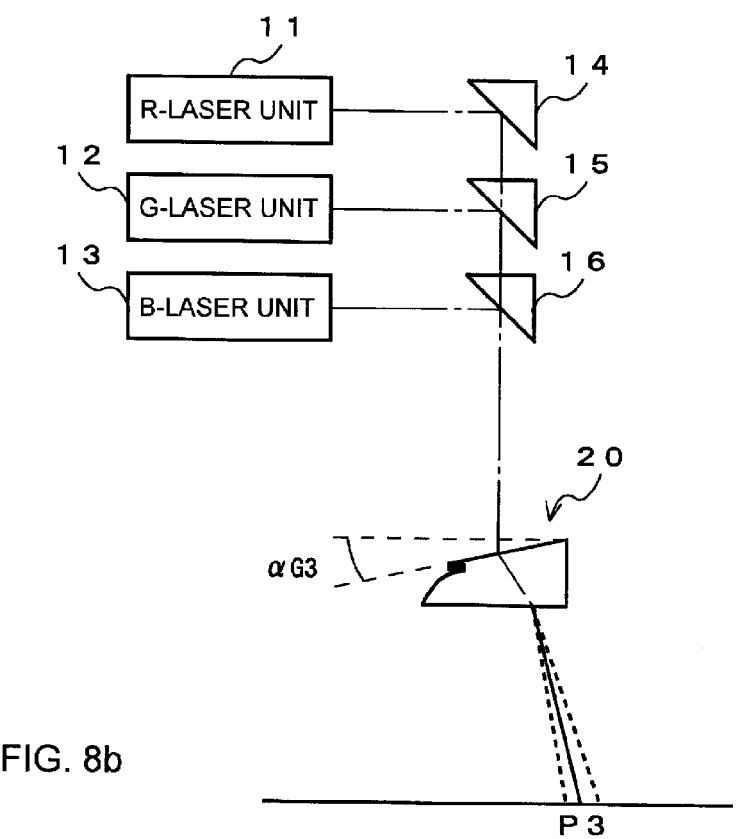
FIG. 8b is a view illustrating how color images are scanned.
Figure 8C:
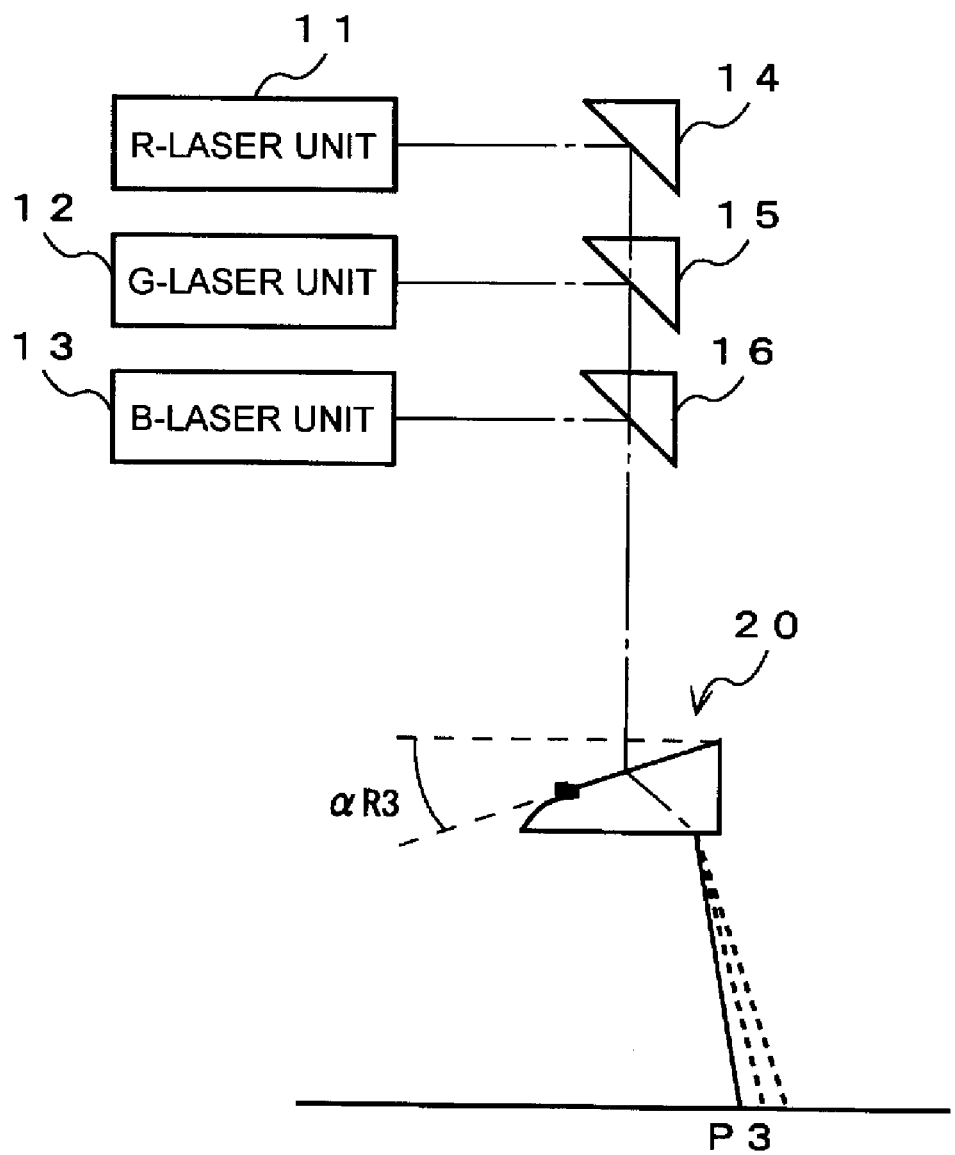
FIG. 8c is a view illustrating how color images are scanned.

FIGS. 8a, 8b, and 8c are views illustrating how a point P3 is scanned. To scan the point P3, the laser control unit 42 and the prism control unit 44 perform the following control operations. First, a prism angle of αB3 is set. In response to this, the blue laser beam scans the point P3. Next, a prism angle of αG3 is set and the green laser beam scans the point P3. Then, a prism angle of αR3 is set and the red laser beam scans the point P3.

As described above, the prism angle for the first prism unit 20 and the timing at which the R-, G-, and B-laser units 11, 12 and 13 emit their laser beams are adjusted to allow the red, green and blue laser beams to scan across the screen S. This produces a color image.

It should be noted that the chromatic aberration can be neglected when the distance between the first prism unit 20 and the screen S is long enough relative to the size of the first prism unit 20. Otherwise, the chromatic aberration should be corrected. This correction of the chromatic aberration may be made manually or automatically. Automatic correction may be made by using a correction table having correction values for the angle of deviation. The correction table may be included in, for example, the prism control unit 44 as in the case of the correction of the color images. For example, the correction table stores the correspondence relation between the distance from the first prism unit 20 to the screen S and the correction value depending on the distance. The distance is measured by using, for example, a position sensitive detector (PSD) and the correction table is looked up to obtain a correction value. The prism angle is corrected according to the correction value.

Alignment of the optical scanning device 1 may sometimes incur a precision error. Any precision error would cause displacement, so that the aforementioned operations are made after calibrating such errors. More specifically, when the laser beam focuses onto a position displaced from the point P2 at the prism angle of 0 degrees, calibration is made by adjusting the alignment of the first prism unit 20 or adjusting the prism angle. Displacement among the R-, G-, and B-laser units 11, 12, and 13, if any, should be adjusted as well.

It should be noted that, without using the driving member 22 and the elastic member 23, the refracting member 21 may directly be driven by a galvanometer.

SECOND EMBODIMENT

Figure 9A:
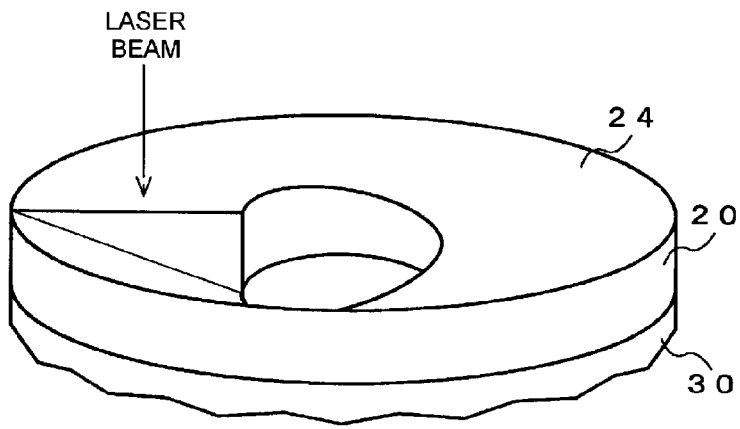
FIG. 9a shows an exemplary configuration for a prism unit according to a second embodiment.
Figure 9B:
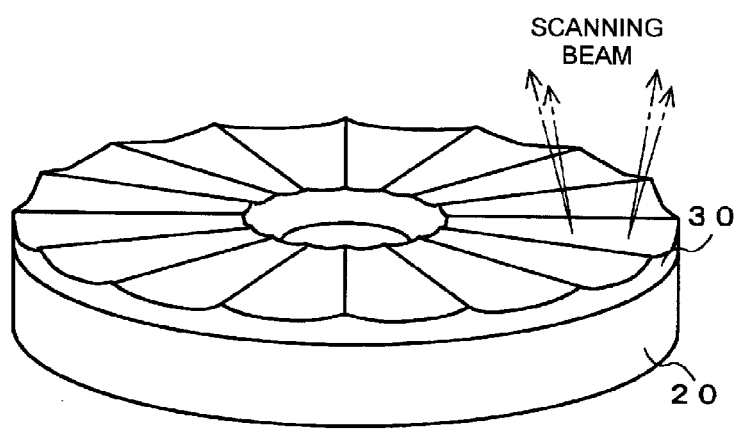
FIG. 9b shows an exemplary configuration for a prism unit according to a second embodiment.

FIGS. 9a, 9b, 9c, and 9d show another example of the first and second prism units 20 and 30. In this example, the first prism unit 20 and the second prism unit 30 are integrally formed as a ring-shaped component having a bore therein. FIG. 9a is a perspective view of the first prism unit 20 while FIG. 9b is a perspective view of the second prism unit 30. The first prism unit 20 and the second prism unit 30 are rotated about a rotation axis (not shown) provided through the central bore for scanning with the laser beam. The first and second prism units 20 and 30 are made of a transparent material such as a plastic glass. The laser beam directed to a beam receiving surface 24 can pass through the first and second prism units 20 and 30. While this embodiment is described in conjunction with a case where the first and second prism units 20 and 30 are integrated with each other, they can be separate components. Alternatively, either one of them is enough if scanning is performed only in one direction.

Figure 9C:
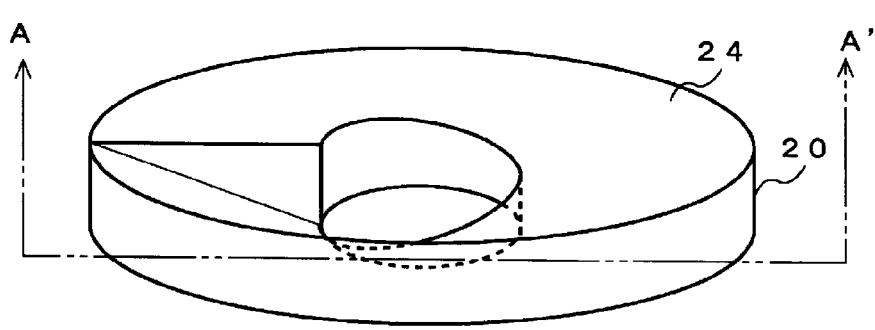
FIG. 9c shows an exemplary configuration for a prism unit according to a second embodiment.
Figure 9D:
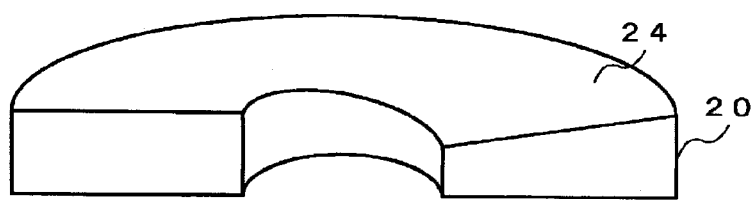
FIG. 9d shows an exemplary configuration for a prism unit according to a second embodiment.

FIG. 9c is a perspective view showing only the first prism unit 20. FIG. 9d is a cross-sectional view of the first prism unit 20 taken along double dashed line in FIG. 9c. As shown in FIGS. 9c and 9d, the beam receiving surface 24 of the first prism unit 20 is gradually inclined from the periphery (0 degrees) to the center (predetermined degrees). Rotation of the first prism unit 20 varies the angle between the optical axis of the laser beam incident on the beam receiving surface 24 and the line perpendicular to the surface at the point of incidence. It is not necessary to provide such a gradient along the whole circumference of the first prism unit 20. It may be provided along a part of the circumference.

As shown in FIG. 9b, the second prism unit 30 has a wavy surface profile with a series of alternating ridges and grooves on the surface along the circumference. Each groove has a continuously varying angle of inclination, which makes it possible to perform scanning at each groove. It should be noted that the grooves are not necessarily formed over the entire surface. They may be formed across at least a portion of the surface.

The laser beam incident on the beam receiving surface 24 of the first prism unit 20 is refracted and emerged at the angle determined depending on the angle of inclination provided from the periphery to the center. The laser beam passing through the first prism unit 20 is thus directed to travel in the direction from the periphery to the center or vice versa. The scanning beam directed to from the first prism unit 20 to the second prism unit 30 is refracted and emerged at an angle determined depending on the angle of inclination of the groove. The scanning beam passing through the second prism unit 30 is thus directed to travel in the direction along the circumference of the unit.

The combination of the first and second prism units 20 and 30 provides two-dimensional scanning. For example, the second prism unit 30 is used for horizontal scanning while the first prism unit 20 is used for vertical scanning.

THIRD EMBODIMENT

Figure 10:
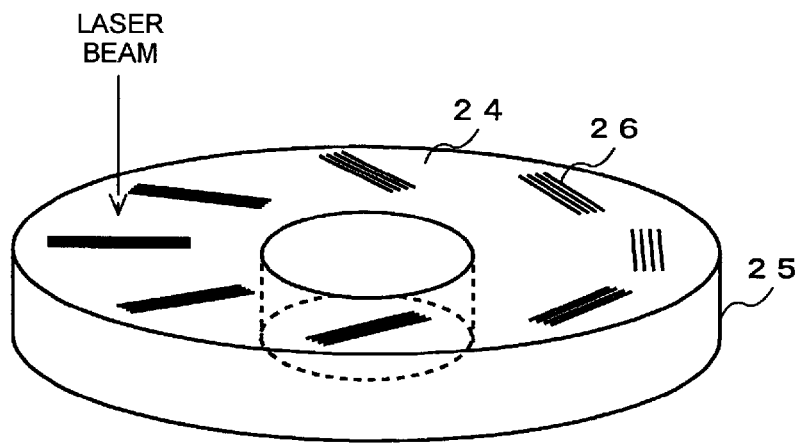
FIG. 10 shows an exemplary configuration for a prism unit according to a third embodiment.

FIG. 10 is a perspective view of a prism unit 25 having diffraction gratings 26 in the ring-shaped beam receiving surface 24 with a bore formed therein. The prism unit 25 is rotated about a rotation axis (not shown) provided through the central bore for scanning with the scanning beam. The prism unit 25 is made of a transparent material such as a plastic glass. The laser beam directed to the beam receiving surface 24 can pass through the prism unit 25.

Each diffraction grating 26 is made up of a set of narrow slits. The diffraction gratings 26 are formed at different angles with respect to each other, that is, one diffraction grating is oriented in the radial direction and another one is oriented in the circumference. There are some others oriented in different directions. The diffraction gratings 26 splits the incident laser beam directed to the beam receiving surface 24 into several beams traveling in different directions. The laser beam will pass through a different diffraction grating 26 as the prism unit 25 rotates, which allows scanning across a predetermined plane.

FOURTH EMBODIMENT

Figure 11:
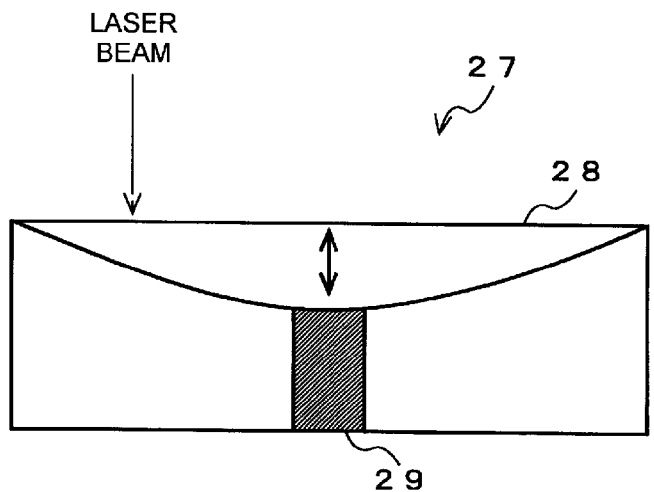
FIG. 11 shows an exemplary configuration for a prism unit according to a fourth embodiment.

FIG. 11 is a view illustrating an exemplary configuration for a prism unit 27 in which a liquid prism 28 having a shape of a plano-convex lens, and artificial muscles 29 are used. The movement of the artificial muscles 29 is controlled by, for example, the first prism driving mechanism 45. The curvature of the liquid prism 28 is controlled by the artificial muscles 29. In other words, the artificial muscles 29 thicken and flatten the liquid prism 28. The change in curvature of the liquid prism 28 results in a change in the angle of deviation between the laser beam incident to the liquid prism 28 and the laser beam emerging from it. This makes it possible to perform linear scanning.

FIFTH EMBODIMENT

Figure 12:
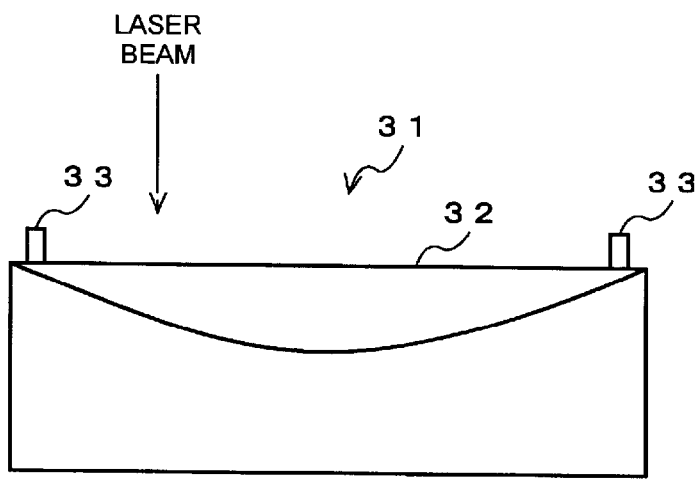
FIG. 12 shows an exemplary configuration for a prism unit according to a fifth embodiment.

FIG. 12 is a view illustrating an exemplary configuration for a prism unit 31 in which a liquid lens 32 having a shape of a plano-convex lens is used. The liquid lens 32 is provided with electrodes 33. The electrodes 33 serve to apply a voltage to the prism unit 31 from, for example, the first prism driving mechanism 45. The refractive index of the liquid crystal lens varies along with the applied voltages. Linearly varying the voltage makes it possible to perform linear scanning.

SIXTH EMBODIMENT

Figure 13A:
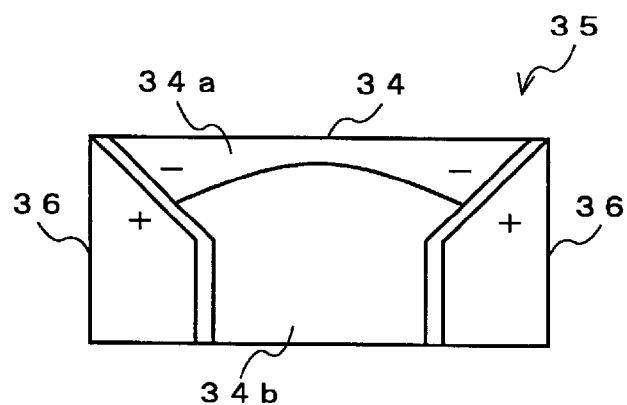
FIG. 13a shows an exemplary configuration for a prism unit according to a sixth embodiment.
Figure 13B:
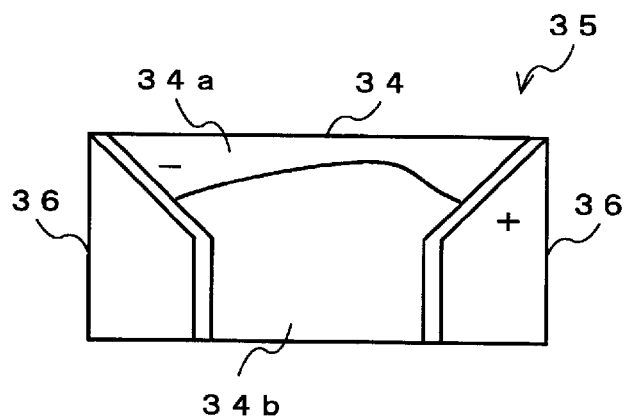
FIG. 13b shows an exemplary configuration for a prism unit according to a sixth embodiment.

FIGS. 13a and 13b are views illustrating an exemplary configuration for a prism unit 35 in which a liquid lens 34 is used.

With the liquid lens 34, the angle of incidence of the laser beam varies along with the voltages applied in an asymmetric fashion. The liquid lens 34 uses two immiscible liquids such as water and oil, forming two distinct layers. The two liquids are contained in an electrically conductive container 36. The liquid lens 34 does not contact any of the surfaces of the container 36 with a narrow gap therebetween. An upper layer 34a of the liquid is applied with a negative voltage. The container 36 is applied with a positive voltage. The variation of voltage leads to a change of curvature of the interface between the upper layer 34a and a lower layer 34b. When these voltages are identical in magnitude to each other, the liquid-liquid interface rises at or around the center as shown in FIG. 13a. On the other hand, when the positive and negative voltages are unbalanced, the surface profile varies as shown in FIG. 13b. The surface profiles of the liquids determine the length of an optical path within the liquid lens 34 and, therefore, the angle of deviation. By altering the surface profile, the screen S can be scanned with the laser beam.

SEVENTH EMBODIMENT

Figure 14:
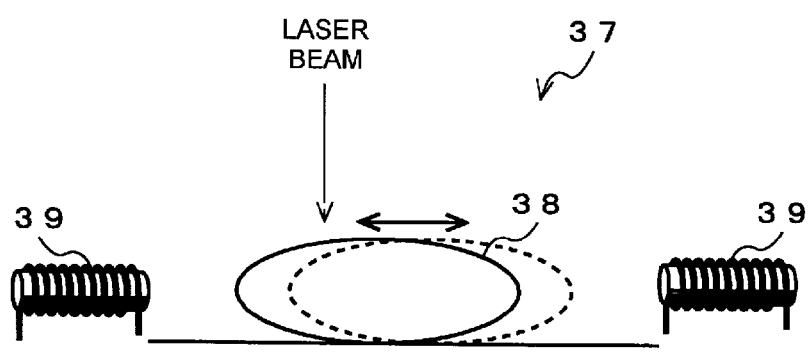
FIG. 14 shows an exemplary configuration for a prism unit according to a seventh embodiment.

FIG. 14 is a view illustrating an exemplary configuration for a prism unit 37 in which a magnetic fluid or an ionic liquid (hereinafter, merely referred to as "fluid 38") having a shape of a convex lens is used.

Electromagnets 39 are provided on both sides of the fluid 38. The electromagnets 39 operate one after the other to produce the magnetic field, which moves the fluid 38 between the electromagnets 39. This movement changes the point of incidence of the laser beam on the fluid 38, which changes the length of the optical path within the fluid 38 through which the laser beam passes. As a result, the refractive index varies, which allows scanning. Much more complicated scanning may be performed when four electromagnets 39 are used at the corners of a square surrounding the fluid 38.

What is claimed is:

1. An optical scanning device comprising:
   first control means for controlling a light source to adjust conditions for emission of an optical signal emitted by said light source;
   a light transmission mechanism adapted to receive the optical signal emitted by said light source, allows the received optical signal to pass therethrough, and emerges it as a scanning optical signal, said light transmission mechanism being also adapted to serve to vary an angle of deviation in response to an input of predetermined control information, the angle of deviation being an angle formed between the incident optical signal entering said light transmission mechanism and the scanning optical signal which emerges from said light transmission mechanism; and
   second control means for use in providing the control information to said light transmission mechanism, wherein said light transmission mechanism includes a light transmission member adapted to deform, according to an external force, at least one of a face on which the optical signal is incident, and another face from which the scanning optical signal emerges, thereby to vary an angle of incidence of the laser beam or an angle of output of the laser beam; and a driving mechanism for use in applying the external force to the light transmission member.

2. The optical scanning device as claimed in Claim 1, wherein
   the light transmission member includes a fluid compartment for containing a fluid with a refractive index that is different from the refractive index of the atmospheric air, the fluid compartment having a joint part made of an elastic material, the joint part connecting the face on which the optical signal is incident and the face from which the scanning beam emerges, the joint part being adapted to deform freely according to the volume of the fluid contained in the fluid compartment.

3. The optical scanning device as claimed in Claim 1, wherein
   the light transmission member is formed to have a ring shape with a bore therein, at least one of the angle of incidence and the angle of output being varied continuously due to a slope formed in the direction from the periphery to the center,
   the driving mechanism being adapted to continuously vary the angle of deviation by means of rotating the light transmission member on the bore.

4. The optical scanning device as claimed in Claim 1, wherein
   the light transmission member is formed to have a ring shape with a bore therein, at least one of the angle of incidence and the angle of output being varied by a wavy surface profile with a series of alternating ridges and grooves on the surface along a predetermined direction,
   the driving mechanism being adapted to periodically vary the angle of deviation at timing determined by the alternating interval of the wavy surface profile by means of rotating the light transmission member on the bore.

5. The optical scanning device as claimed in Claim 1, wherein
   the light transmission member is formed to have a ring shape with a bore therein, at least one of the angle of incidence and the angle of output being varied by a plurality of diffraction gratings formed in a surface thereof,
   each diffraction grating being made up of a set of slits the orientation of which is different from the orientation of other sets of slits,
   the driving mechanism being adapted to vary the angle of deviation according to the orientation of the slits by means of rotating the light transmission member on the bore.

6. The optical scanning device as claimed in Claim 1, wherein
   the light transmission member includes a liquid prism having a shape of a plano-convex lens,
   the driving mechanism including a contractile member connected to a convex portion of the liquid prism, the driving mechanism being adapted to contract and extend the contractile member according to the control information to vary the curvature of the convex portion of the liquid prism, thereby to vary at least one of the angle of incidence of the optical signal directed to the liquid prism and the angle of output of the scanning optical signal.

7. The optical scanning device as claimed in claim 1, wherein
   the light transmission member includes a liquid lens having a shape of a plano-convex lens of which refractive index varies along with a voltage applied thereto, the driving mechanism being adapted to apply a voltage having a value determined according to the control information to the liquid lens, thereby to vary at least one of the angle of incidence of the optical signal directed to the liquid lens and the angle of output of the scanning optical signal.

8. The optical scanning device as claimed in Claim 1, wherein the light transmission member includes a liquid lens which uses two immiscible liquids forming two distinct layers, the liquids being contained in an electrically conductive container, the driving mechanism being adapted to apply a voltage having a value determined according to the control information to the container and one of the layers of the liquid lens to deform the surface profile of the liquid-liquid interface of the liquid lens, thereby to vary at least one of the angle of incidence of the optical signal directed to the liquid lens and the angle of output of the scanning optical signal.

9. The optical scanning device as claimed in Claim 1, wherein the light transmission member includes a lens-shaped fluid which is displaced in response to a magnetic force, the driving mechanism including electromagnets disposed on both sides of the fluid and a control device for the electromagnets, the control device being adapted to produce a magnetic field by the flow of an electric current through the electromagnets according to the control information to displace the fluid, thereby to vary at least one of the angle of incidence of the optical signal directed to the fluid and the angle of output of the scanning optical signal.

10. The optical scanning device as claimed in claim 9, wherein the fluid is either a magnetic fluid or an ionic liquid.

11. The optical scanning device as claimed in Claim 1, wherein the light transmission member includes a first refracting member having a first beam receiving surface, the first beam receiving surface being for adjusting an angle between the laser beam incident on the first beam receiving surface and the line perpendicular to the surface at the point of incidence, the first refracting member being adapted to move the scanning optical signal in a straight in a first direction according to the angle of incidence on the first beam receiving surface, and a second refracting member having a second beam receiving surface, the second beam receiving surface being for receiving the scanning optical signal emitted by the first refracting member, the second refracting member being adapted to change the angle of incidence upon reception of the scanning optical signal, the second refracting member being adapted to move the scanning optical signal received through the second beam receiving surface in a straight in a second direction according to the angle of incidence on the second beam receiving surface, the second direction being perpendicular to the first direction, a combination of the first refracting member and the second refracting member allowing the scanning optical signal to move in a two-dimensional plane.

12. The optical scanning device as claimed in claims 1, wherein the light source is for producing laser beams of different colors as the optical signals, the first control means being adapted to control the light source to produce the laser beams of the different colors one by one as the optical signal, the second control means having a correction table on which correction values for the angle of deviation are stored, the second control means being adapted to read, from the correction table, a correction value suitable for the color of the laser to be emitted by the light source, to produce the control information according to the read correction value, or to correct the control information produced.

* * * * *